United States Patent [19]

Sekiguchi

[11] 4,237,475
[45] Dec. 2, 1980

[54] TELEVISION CAMERA WITH TEST PATTERN

[75] Inventor: Takeshi Sekiguchi, Tokyo, Japan

[73] Assignee: Canon Kabushiki Kaisha, Tokyo, Japan

[21] Appl. No.: 24,035

[22] Filed: Mar. 26, 1979

Related U.S. Application Data

[63] Continuation of Ser. No. 888,780, Mar. 21, 1978, abandoned.

[30] Foreign Application Priority Data

| Mar. 10, 1977 | [JP] | Japan | 52-34945 |
| Mar. 29, 1977 | [JP] | Japan | 52-47097 |
| Apr. 22, 1978 | [JP] | Japan | 53-27386 |

[51] Int. Cl.³ .............................................. H04N 9/04
[52] U.S. Cl. ........................................ 358/10; 358/29; 358/41; 358/55
[58] Field of Search ...................... 358/10, 29, 41, 55

[56] References Cited

U.S. PATENT DOCUMENTS

| 3,043,179 | 7/1962 | Dunn | 88/1 |
| 3,479,448 | 11/1969 | Kollsman | 358/10 X |
| 3,586,562 | 6/1971 | Sturbridge | 156/174 |
| 3,825,335 | 7/1974 | Reynolds | 355/1 |
| 3,825,336 | 7/1974 | Reynolds | 355/1 |

Primary Examiner—Robert L. Richardson
Attorney, Agent, or Firm—Fitzpatrick, Cella, Harper & Scinto

[57] ABSTRACT

This invention discloses a television camera provided with a test pattern projecting device which is capable of forming an image of a test pattern of a desired color temperature onto the television tube. In said test pattern projecting device, an image of test pattern with adjustable color temperature is obtained by spatially dividing the test pattern illuminating light beam of a test pattern projecting light beam into plural color component beams, independently regulating the strength of said divided component beams and again uniting said divided component beams.

9 Claims, 22 Drawing Figures

TELEVISION CAMERA WITH TEST PATTERN

This is a continuation of application Ser. No. 888,780, filed Mar. 21, 1978, and now abandoned.

BACKGROUND OF THE INVENTION

1. Field of the Invention

The present invention relates to a television camera provided with a test pattern projecting apparatus fixedly or detachably mounted on the objective lens.

2. Description of the Prior Art

The color television cameras currently employed for broadcasting are mostly of three-tube type and require a series of adjusting operations in order to assure a satisfactory color quality at the replacement of television tubes, at the periodical maintenance and prior to starting use. Such adjustments have been achieved by illuminating a test pattern for inspecting control items such as resolution, registration, gray scale etc., forming the image of said test pattern through the objective lens onto the television tube, framing said image to a standard size and adjusting the CCU (Color Control Unit) which is partially located on the camera while observing thus formed image. The projection of such test pattern has usually been achieved by illuminating a test pattern of translucent type or reflective type with outdoor light. Such method, however, requires time and cumbersome operations since the conditions of test pattern setting has to be determined each time.

Besides, although the color television cameras have shown remarkable improvements in stability, they often require, even during the use thereof, a temporary check with a test pattern which is difficult to achieve with the above-mentioned method.

In order to resolve such drawback and to improve the function of color television cameras there has been proposed a method of incorporating a test pattern projecting apparatus in a zoom lens which constitutes the objective lens of the television camera, but such apparatus has only been used for auxiliary purpose because of unsatisfactory performance thereof.

One of such unsatisfactory performances lies in the difficulty of forming a pattern image of a desired color temperature on the television tube.

SUMMARY OF THE INVENTION

The object of the present invention is to provide a television camera provided with a test pattern projecting apparatus capable of easily forming an image of a test pattern with a desired color temperature.

The above-mentioned object is achieved, in said test pattern projecting apparatus, by forming plural color component light beams, adjusting the strength of at least one of said light beams and again uniting said component light beams.

The above-mentioned color component light beam is not necessarily limited to a beam of a single color but also include a mixture of plural single-color beams.

DESCRIPTION OF THE PREFERRED EMBODIMENTS

Now the present invention will be explained in detail with particular reference to the attached drawings.

As explained in the foregoing the pattern projection can be achieved by two methods, which will be explained with reference to FIG. 1.

Figure 1:
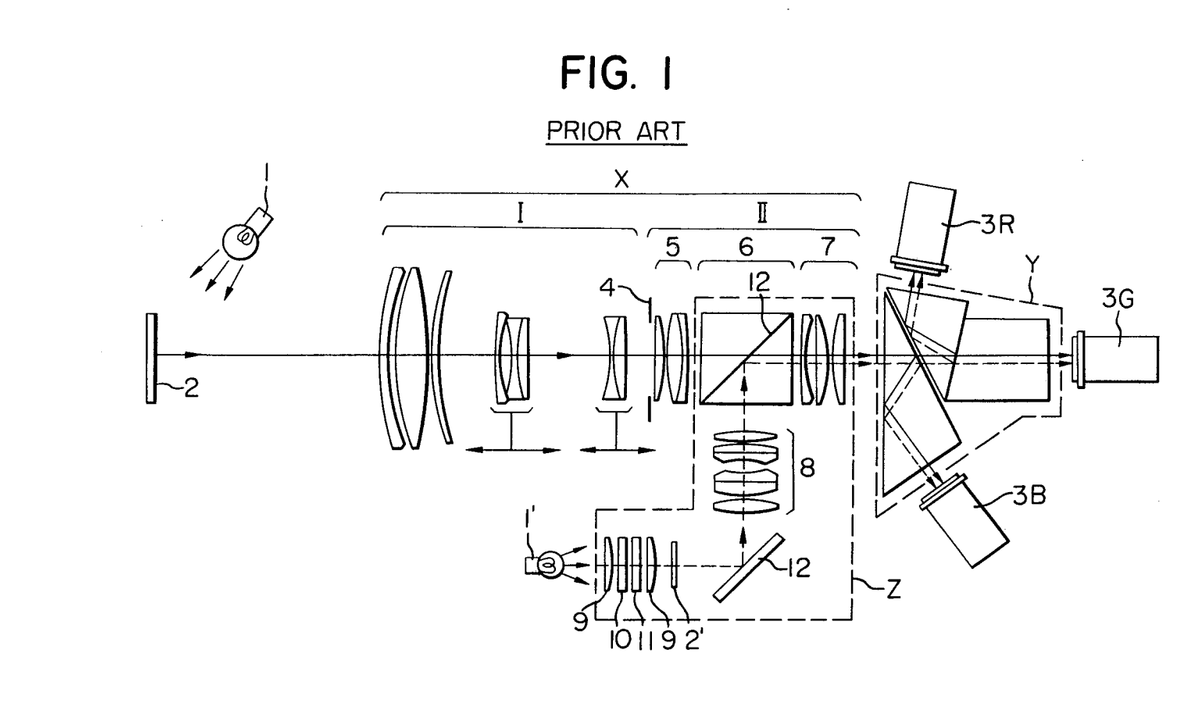
FIG. 1 is a drawing showing optical arrangement in a conventional television camera.

Now referring to FIG. 1 explaining the conventional test pattern projecting method with outdoor light, a light source 1 illuminates a reflective test pattern chart 2 for example for gray scale adjustment, said pattern being transmitted through a zoom lens X composed of a zoom section I and a relay section II and further through a three-color separating prism system Y to be decomposed into red, green and blue lights which are respectively focused on the light-receiving faces of three image tubes $3_{RGB}$. In such process the chart 2 is illuminated with the light source 1 so as to achieve a standard imaging conditions of a color temperature of 3000° K. and an illumination of 2000 lux, and the illumination on the image tubes is controlled by a diaphragm 4 of the zoom lens X.

An another pattern image forming method, also shown in FIG. 1, is achieved by an incorporated pattern projecting apparatus wherein a light source 1' for example a tungsten incandescent lamp illuminates, through a condenser lens 9, a transmission test pattern chart 2', from which the transmitted light is reflected by a mirror 12 and guided to a projecting lens 8. The light therefrom is reflected by a half mirror 6 located between a relay lens front group 5 and a relay lens rear group 7 of said relay section II of the zoom lens X, and passes through said rear group 7 and the color-separating prism Y to be separated into the red, green and blue lights, thus reaching the respective light-receiving faces of image tubes $3_{RGB}$. In this manner the images of the chart 2' are focused on said light-receiving faces by means of the projecting lens 8 and the rear group 7 of relay lens section.

In such apparatus, the power supply for the light source 1 is usually obtained from the stabilized DC supply of a voltage of 24 V and a current capacity of 0.75 A commonly utilized for the circuitry of color television camera, for this reason it is not possible to use lamps of a high color temperature such as a halogen lamp or a so-called optical bulb with flat-wound filament. Thus the light source is usually composed of an ordinary tungsten incandescent lamp with a selected color temperature of 2550°±50° K., which is lower by ca. 450° K. than the illumination of outdoor light.

Also the zoom lens X is generally provided with spectral transmission characteristics with higher absorption in the blue wavelength range than in the green or red wavelength range due to frequent use of high-refracting glasses for the correction of aberrations, whereas the incorporated pattern projecting system generally shows a lower blue light absorption because of the total glass thickness considerably smaller than in the zoom lens X and also because of relatively scarce use of high-refracting glasses.

Thus, comparing the test pattern image formation with the outdoor light and with the built-in pattern projecting apparatus, wherein the illumination of image on the image tube $3_G$ for green wavelength range being taken as standard, the image illumination on the red image tube $3_R$ will be higher in the latter method while that on the blue image tube $3_B$ will be higher in the former method. For this reason a color filter (spectral correction filter) 10 and an ND (neutral density) filter 11 are provided in the vicinity of the condenser lens 9 of the built-in pattern projecting apparatus so as to compensate such differences in the illuminations.

Nevertheless it has been extremely difficult to match the test pattern image formed by the built-in light source with that obtained by the outdoor light because of the difficulty in preparing a suitable color correction filter 10 and of fluctuations in the color temperature of the tungsten lamp used as the light source 1' and in the coating on the lenses and mirrors in the pattern projecting system.

Assuming that the ratio of illuminations of the red, green and blue images on the image tubes is 1:1:1 for a light source of 2550° K., a color temperature change of 50° K. or −50° K. of the light source 1' will change said ratio respectively to 0.98:1:1.04 or to 1.03:1:0.96. These changes significantly exceed the practically permissible adjustable range of 0.1–0.2%. Thus, in comparison with the color quality obtained by adjusting the sensitivity of the image tubes with a light source of 2550° K., a fluctuation of +50° K. of −50° K. in the color temperature of light source will result in a reddish or bluish color quality, respectively, which is not acceptable for practical purposes.

On the other hand, a tolerance for the lamp narrower than ±50° K. is not practical in consideration of the supply quantity and price.

Thus the use of built-in pattern projecting apparatus has been limited to auxiliary purposes as the pattern image formation by such apparatus could not be made identical with that formed by outdoor light.

Now there will be explained, in the following, various embodiments of the present invention.

In a first embodiment of the present invention a test pattern image of a desired color temperature is obtained by forming plural color component light beams in the light source unit for illuminating the test pattern, independently regulating the strengths of said beams and uniting such regulated beams to obtain an illuminating light of a desired color temperature.

Figure 2:
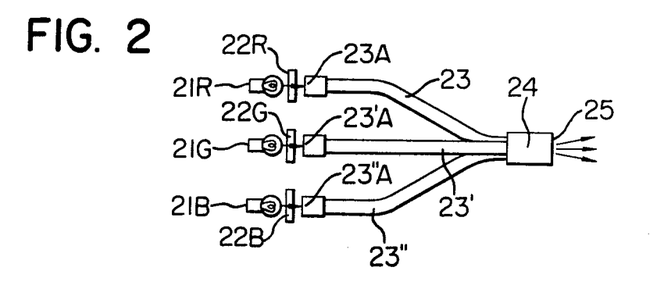
FIG. 2 is a drawing showing a light source in a first embodiment of the present invention.
Figure 3A:
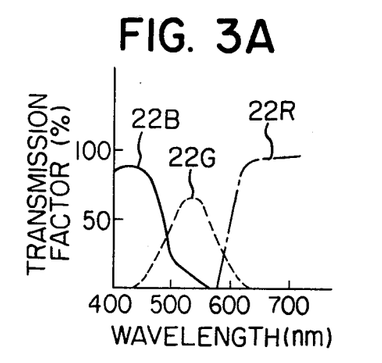
FIGS. 3A and 3B are charts showing the spectral light transmission of the filter used in the camera of FIG. 1.
Figure 3B:
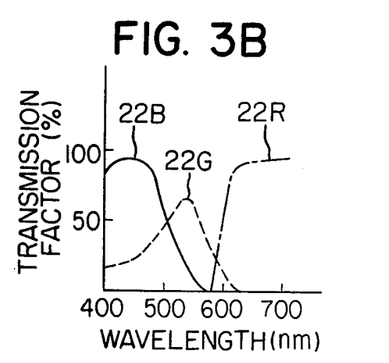

The arrangement of the first embodiment is identical with that shown in FIG. 1 except that the light source section is replaced by a light source 1' shown in FIG. 2, wherein 23, 23' and 23" are light-transmitting elements such as bundles of optical fibers, which are bound together at an end thereof by means of a tube 24. $21_R'$, $24_G$ and $24_B$ are same or different light sources for example composed of tungsten lamps. Between said light sources $21_{RGB}$ and said light-transmitting elements 23, 23' and 23" there are respectively provided a red filter 22R principally transmitting red wavelength range, a green filter 22G principally transmitting green wavelength range and a blue filter 22B principally transmitting blue wavelength range. Examples of spectral transmission characteristics of said filters 22RGB are shown in FIGS. 3A and 3B. In case the light sources 21RGB are of a relatively low color temperature with resulting deficient proportion in blue wavelength range, there is preferred the use of filters as shown in FIG. 3B since the green filter 22G also functions to transmit the blue light to compensate said deficiency.

The light from said light sources 21RGB are guided through said filter 22RGB to the inlets 23A, 23'A and 23"A of said light-transmitting elements 23, 23' and 23", then transmitted therein and diffused as a mixture of red, green and blue lights from the united outlet 25.

Figure 4A:
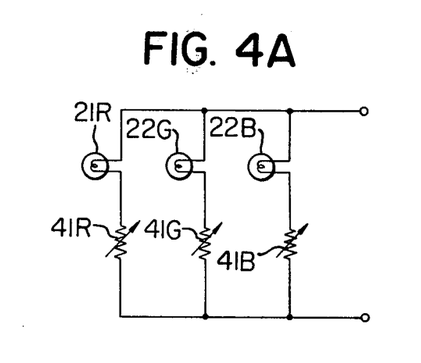
FIGS. 4A and 4B are circuit diagrams for controlling the light emission from the light source in FIG. 1.
Figure 4B:
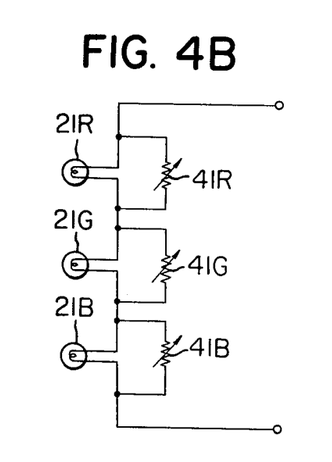

In this case the intensities of said red, green and blue lights can be independently regulated by varying the brightness of the light sources 21RGB through variable register 41RGB provided in the electric circuit as shown in FIG. 4A or FIG. 4B. The circuits of FIG. 4A and 4B are respectively suitable for a DC power supply with a constant voltage and for a DC power supply with a constant current.

The above-mentioned light outlet 25 can be located at the position of light source 1' in FIG. 1. In the present embodiment the color filter 10 and ND filter 11 shown in FIG. 1 can be dispensed with since the light sources are provided with a function of regulating the red, green and blue lights independently. Furthermore the color filters 22RGB can also be dispensed with if the light sources 21RGB themselves are already provided with the characteristics of said filters.

Figure 5A:
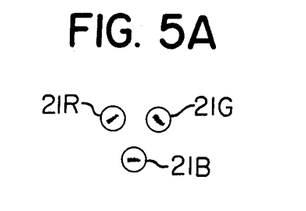
FIGS. 5A and 5B are drawings showing a light source in a second embodiment of the present invention.
Figure 5B:
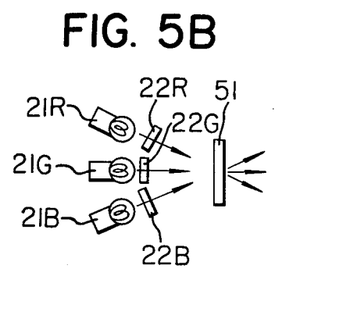

FIGS. 5A and 5B show a second embodiment of the present invention wherein light sources 21RGB illuminate, through red, green and blue filters 22RGB, a diffusing plate 51 which is located at the position of light source 1' in FIG. 1. In this embodiment the condenser lens 9 should be selected so as not to cause uneven projection if the diffusibility of diffusing plate 15 is not sufficient as the pattern projecting apparatus will tend to give uneven projection in such case. An arrangement of the light sources 21RGB shown in FIG. 5B will allow reduction of the dimension and facilitate the selection of the condenser lens 9.

Figure 6:
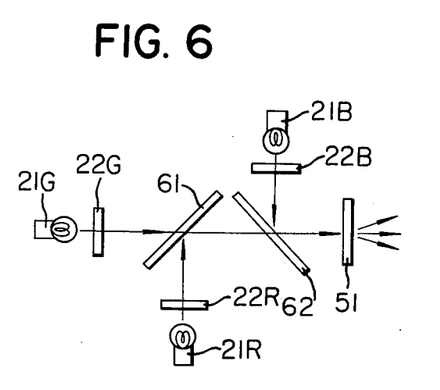
FIG. 6 is a drawing showing a light source in a third embodiment of the present invention.

FIG. 6 shows a third embodiment of the present invention wherein the lights from the light sources 21RGB are synthesized by half mirrors or dichroic mirrors 61 and 62 to illuminate the diffusing plate 51. The remaining portion of the apparatus is constructed identical with that shown in FIGS. 5A and 5B.

The intensity control of the light sources in the embodiments shown in FIGS. 5A, 5B and 6 can be achieved in the same manner as in the embodiment shown in FIG. 2.

Figure 7:
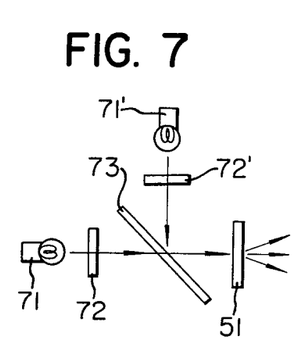
FIG. 7 is a drawing showing a light source in a fourth embodiment of the present invention.
Figure 8:
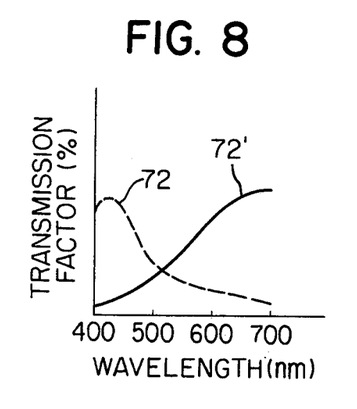
FIG. 8 is a chart showing the spectral light transmission of the dichroic mirror in FIG. 7.

FIG. 7 shows a fourth embodiment of the present invention utilizing two light sources 71, 71', wherein 72 and 72' are color correction filters for example of spectral characteristics shown in FIG. 8, and the lights from said light sources 71, 71' are synthesized by a half mirror 73 to illuminate the diffusing plate 51. In this embodiment the voltages or current to said two light sources 71, 71' are independently regulated to suitably modify the color temperature of the light source and to obtain desired balance of the red, green and blue lights, and the total intensity of the light is controlled by an ND filter 11 or by a diaphragm provided inside the pattern projecting optical system.

Although in the foregoing embodiments the plural component light beams are obtained from plural light sources, it is also possible to obtain such plural beams by dividing a light beam from a single light source.

Figure 9:
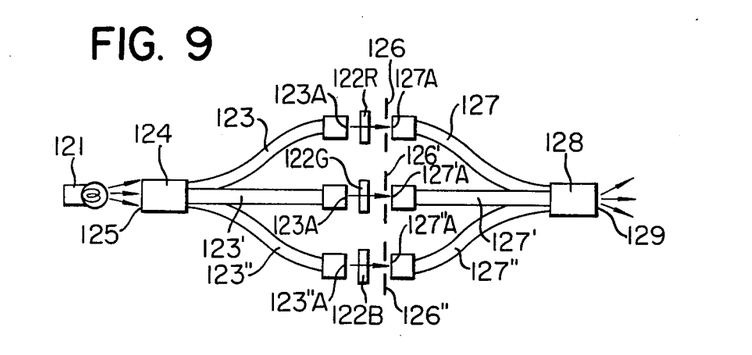
FIG. 9 is a drawing showing a light source in a fifth embodiment of the present invention.

Now referring to FIG. 9 showing a fifth embodiment utilizing such single light source, 123, 123', 123''; and 127, 127' and 127'' are light-transmitting elements such as optical fiber bundles which are respectively united, at an end thereof, with tubes 24 and 28. The outlet ends 123A, 123A' and 123A'' of said elements 123, 123' and 123'' are so arranged as to respectively face the inlet ends 127A, 127A' and 127A'' of said elements 127, 127' and 127'', and between the light-transmitting elements 123 and 127 there is provided a red filter 122R principally absorbing red wavelength range and an intensity regulating diaphragm 126. Similarly a green filter 122G and a diaphragm 126' are provided between the elements 123' and 127', and a blue filter 122B and a diaphragm 126'' between the elements 123'' and 127''.

The light from the light source 21 composed for example of a tungsten lamp is guided to the inlet 25 of the tube 24 binding said light-transmitting elements 123, 123' and 123'' together, transmitted therein and emitted from the outlets 123A, 123A' and 123A'' thereof. Upon passing through the color filters 122R, 122G and 122B and the diaphragms 126, 126' and 126'', the light beams are guided to the facing inlets 127A, 127A' and 127A'' of the other light-transmitting elements 127, 127' and 127'', transmitted therein and emitted from the united outlet 129 of the tube 128 as a mixture of red, green and blue lights. In this case the intensities of said red, green and blue lights can be independently controlled by means of the diaphragms 126, 126' and 126''. Also said diaphragms may be dispensed with if the intensity control is achieved by varying the distances between the outlets 123A, 123A' and 123A'' and the inlets 127A, 127A' and 127A''.

In this embodiment the light outlet 129 is located at the position of the light source 1' in the arrangement shown in FIG. 1. Also the color filter 10 and the ND filter 11 shown in FIG. 1 can be dispensed with as the light source of this embodiment is provided with a function of independently regulating the intensities of red, green and blue lights.

Figure 10A:
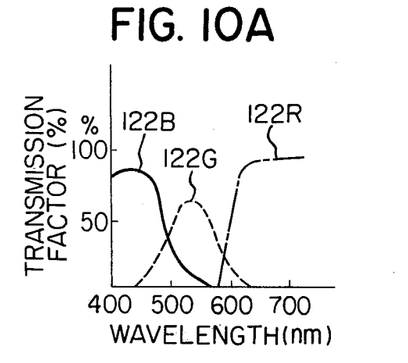
FIGS. 10A and 10B are charts showing the spectral light transmission of the filter in FIG. 9.
Figure 10B:
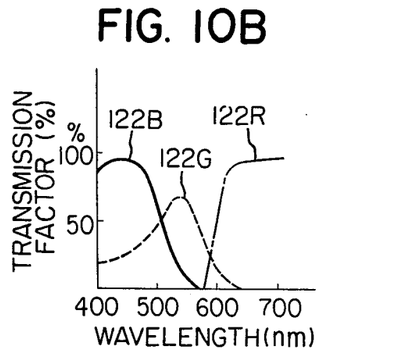

Examples of the spectral transmission characteristics of said red, green and blue filters 122RGB are shown in FIGS. 10A and 10B. The use of filters with characteristics as shown in FIG. 10B is preferable in case the light source 121 is of a relatively low color temperature with resulting deficient proportion of blue wavelength range, since the green filter 122G also functions to transmit the blue light to compensate said deficiency.

Figure 11:
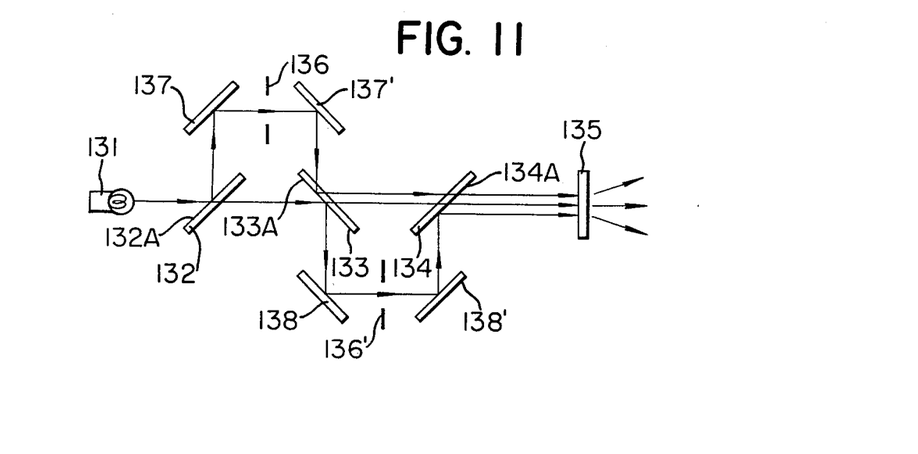
FIG. 11 is a drawing showing a light source in a sixth embodiment of the present invention.
Figure 12A:
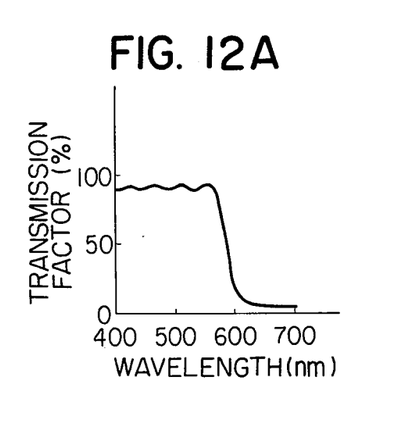
FIGS. 12A, 12B and 12C are charts showing spectral light transmission of the filter in FIG. 10.
Figure 12B:
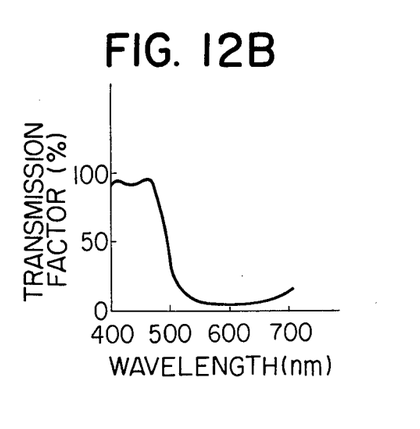
Figure 12C:
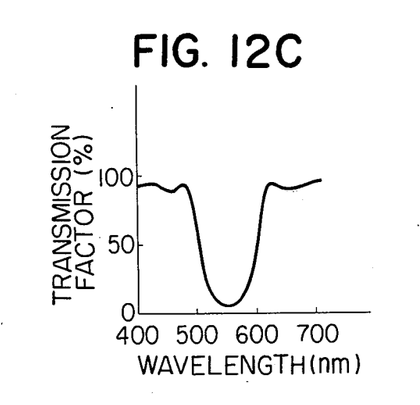

FIG. 11 shows a sixth embodiment of the present invention employing a light source 131, a red-reflecting dichroic mirror 132, a blue-transmitting dichroic mirror 133, a green-reflecting dichroic mirror 134 and a diffusing plate 135. Said dichroic mirrors are arranged in slanted positions as shown in FIG. 11 and are provided with spectral characteristics as shown in FIGS. 12A, 12B and 12C.

The red light emitted from the light source 131 is reflected by a dichroic surface 132A of the red-reflecting dichroic mirror 132, further reflected by the mirrors 137 and 137' and dichroic surface 133A of the blue-transmitting dichroic mirror 133, and guided through the green-reflecting dichroic mirror 134 to the diffusing plate 135.

The green light emitted from the light source 131 is reflected, after passing through the red-reflecting dichroic mirror 132, by the dichroic surface of the blue-transmitting dichroic mirror 133, further reflected by the mirror 138, 138' and a dichroic surface 134A of the green-reflecting dichroic mirror 134 and guided to the diffusing plate 135.

The blue light emitted from the light source 131 passes through the red-reflecting dichroic mirror 132, blue-transmitting dichroic mirror 133 and green-reflecting dichroic mirror 134 and is guided to the diffusing plate 135. In this embodiment said diffusing plate 135 is located at the position of the light source 1' in the arrangement of FIG. 1.

The intensities of the red, green and blue lights can be arbitrarily controlled by regulating the apertures of the diaphragms 136, 136' provided in the light paths for red and green lights and also by regulating the voltage to be supplied to the light source 131.

Furthermore it is possible to dispense with said diffusing plate 135 by suitably selecting the condenser lens 9 and modifying the position thereof in the arrangement shown in FIG. 1.

Figure 13:
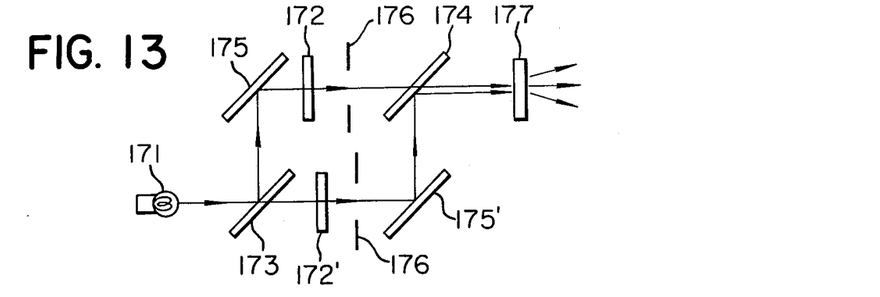
FIG. 13 is a drawing showing a light source in a seventh embodiment of the present invention.

FIG. 13 shows a seventh embodiment of the present invention wherein the light emitted from a light source 171 is split into two beams by means of a half mirror 173, said beams being reflected by the mirrors 175, 175' and again united by means of a half mirror 174 whereupon the united beam is guided to the diffusing plate 177, which is to be located at the position of the light source 1' in the arrangement shown in FIG. 1.

Figure 14:
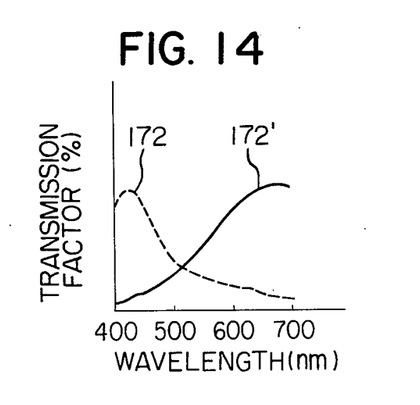
FIG. 14 is a chart showing the spectral light transmission of the dichroic mirror in FIG. 13.

In this embodiment the intensities of red, green and blue lights can be arbitrarily controlled by providing diaphragms 176, 176' and color filters 172, 172' of spectral characteristics as shown in FIG. 14 and by suitably regulating the apertures of said diaphragms and also regulating the voltage to be supplied to the light source 131.

Figures 15, 16:
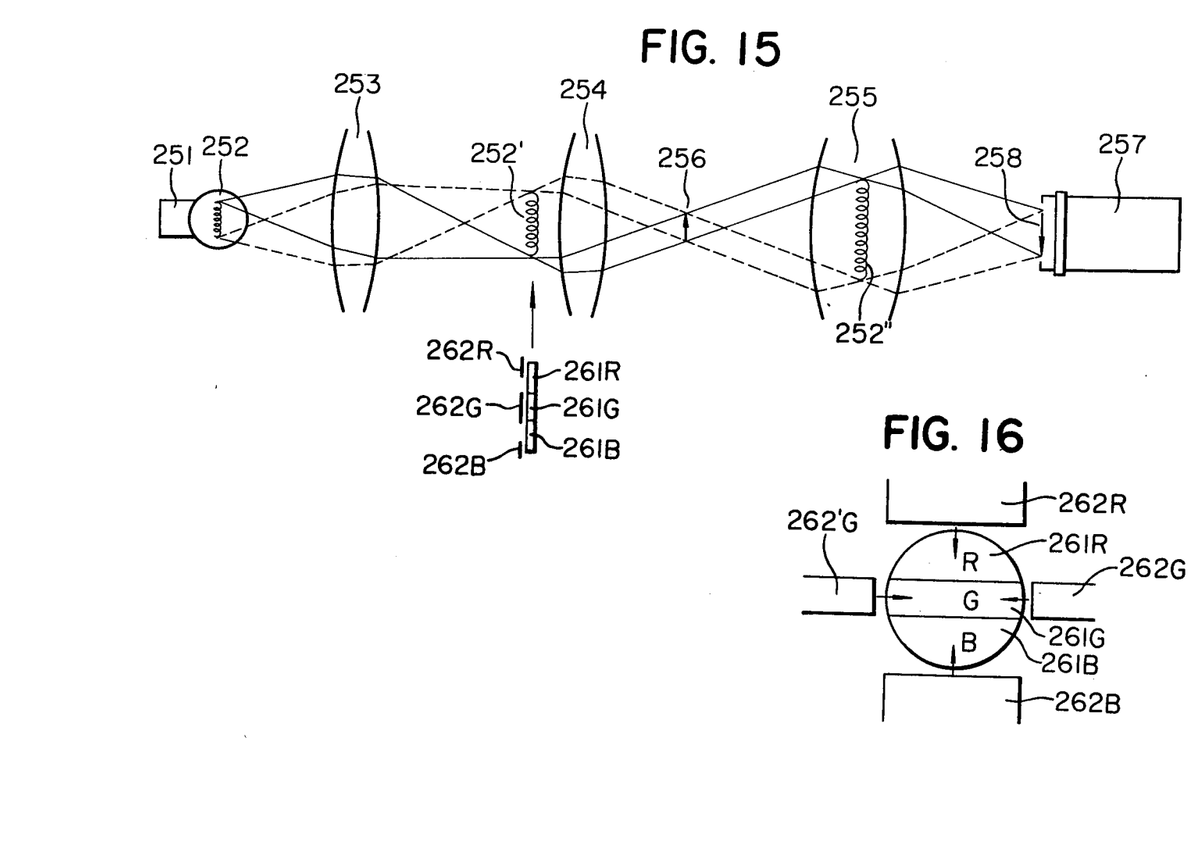
FIG. 15 is a drawing showing the optical arrangement of a eighth embodiment of the present invention.
FIG. 16 is a drawing showing the filter in FIG. 15.

Now FIG. 15 shows an eighth embodiment of the present invention wherein 251 is a tungsten lamp, 252 is a filament thereof, and 253 is a lens for forming an image 252' of said filament 252. 254 is a lens of which front focal plane is located at said image 252' of filament, and 256 is a test pattern located at the rear focal plane of said lens 254. 255 is a lens corresponding to the lenses 8, 7 in FIG. 1 and forming an image of test pattern on the light-receiving face 258 of the image tube 257. 252'' is the image of filament formed at the pupil position of the lens 255. At the position of filament image 252' there is provided a filter as shown in FIG. 16 in order to spatially divide the light beam from the lens 253, said filter being composed of a red-transmitting filter 261R, a green-transmitting filter 261G and a blue-transmitting filter 261B. 262R, 262G and 262B are light shields respectively advanceable on and retractable from the surfaces of said filters 261R, 261G and 261B. In this manner the color temperature can be controlled by independently regulating the covering amounts of said shields. Said filters 261 and shields 262 may also be provided in the position of filament image 252", wherein the color temperature correcting means is therefore located inside the projecting light path. Further, said means cannot be located at any arbitrary position in the projecting optical system but should preferably be in front of the half mirror 12 shown in FIG. 1.

What I claim:

1. A television camera provided with a test pattern projecting device, comprising:
   an objective lens;
   a color-separating optical system provided on the optical axis of said objective lens;
   image-taking devices for sensing the monochromatic images formed by said objective lens and said color-separating optical system;
   a test pattern chart projecting means including a light source for illuminating said test pattern chart, a lens means for forming images of said test pattern on said image-taking devices, a means for forming plural color component light beams within said projecting means, a means for regulating intensity of at least one of said plural color component light beams, and a means for again uniting said plural light beams; and
   a deflecting means for deflecting the optical axis of said test pattern chart projecting apparatus so as that said optical axis coincides with the optical axis of said objective lens.

2. A television camera provided with a test pattern projecting device, comprising:
   an objective lens;
   a color separating optical system provided on the optical axis of said objective lens;
   image-taking devices for sensing color-separated images formed by said objective lens and said color-separating optical system;
   a test pattern chart projecting device including at least one light source for illuminating said test pattern chart, lens means for forming images of said test pattern chart on said image-taking devices, means for forming plural color component light beams and for regulating intensity of at least one of said plural color component light beams, and a means for uniting said plural light beams; and
   deflecting means for deflecting the optical axis of said test pattern chart projecting device so that said optical axis coincides with the optical axis of said objective lens.

3. A television camera provided with a test pattern projecting device, comprising:
   an objective lens;
   a color-separating optical system provided on the optical axis of said objective lens for forming plural color-separated images on a focal plane of said objective lens;
   image-taking devices for sensing the plural color-separated images;
   a test pattern chart projecting device including plural color component light sources for illuminating said test pattern chart,
   lens means for forming images of said test pattern on said image-taking devices, means for regulating brightness of at least one of said plural color component light sources, and means for uniting plural color component light beams coming from said plural light color component light sources; and
   deflecting means for deflecting the optical axis of said test pattern chart projecting device so that said optical axis coincides with the optical axis of said objective lens.

4. In a television camera claimed in claim 3, wherein said means for uniting plural color component beams is optical fiber means having plural incident surfaces each of which faces optically said plural color component light sources respectively and an exit surface optically facing said test pattern chart.

5. A television camera provided with a test pattern projecting device, comprising:
   an objective lens;
   a color-separating optical system provided on the optical axis of said objective lens;
   image-taking devices for sensing color-separated images formed by said objective lens and said color-separating optical system;
   a test pattern chart projecting device including one light source for illuminating said test pattern chart, lens means for forming image of said test pattern on said image-taking devices, a means for separating plural color component light beams and for regulating intensity of at least one of said plural color component light beams, and means for uniting said plural light beams; and
   deflecting means for deflecting the optical axis of said test pattern chart projecting device so that said optical axis coincides with the optical axis of said objective lens.

6. A television camera provided with a test pattern projecting device, comprising:
   an objective lens;
   a color-separating optical system provided on the optical axis of said objective lens;
   image-taking devices for sensing color-separated images formed by said objective lens and said color-separating optical system;
   a test pattern chart projecting device including illumination means having at least one light source and lens for illuminating said test pattern chart on said image-taking devices, means for forming plural color component light beams positioned on an image plane of said light source formed by one of said lens and said imaging lens, means for regulating intensity of at least one of said plural color component light beams positioned on an image plane of said light source formed by one of said lens and said imaging lens; and
   deflecting means for deflecting the optical axis of said test pattern chart projecting device so that said optical axis coincides with optical axis of said objective lens.

7. A television camera provided with a test pattern projecting device, comprising:
   an objective lens for receiving light coming from an object illuminated with a light source of some color temperature;
   a color-separating optical system provided on the optical axis of said objective lens;
   image-taking devices for sensing color-separated images formed by said objective lens and said color-separating optical system;
   a test pattern chart illuminating device including plural color component light sources, a means for regulating brightness of at least one of said plural color component light sources, and means for uniting plural color component light beams coming from said plural color component light sources so that the test pattern chart is illuminated with illuminating device of multicolor matching said some color temperature of the light source;

a lens means for forming image of said test pattern on said image-taking device; and a deflecting means for deflecting the optical axis of said lens means so that said optical axis coincide with the optical axis of said objective lens.

8. In a television camera claimed in claim 7, said means for uniting plural color component beams is an optical fiber means having plural incident surfaces, each of which faces optically said plural color component light sources respectively, and exit surface facing optically said test pattern chart.

9. A television camera provided with a test pattern projecting device, comprising:

an objective lens for receiving light coming from an object illuminated with a light source of some color temperature;

a color-separating optical system provided on the optical axis of said objective lens;

image-taking devices for sensing color-separated images formed by said objective lens and said color-separating optical system;

a test pattern chart projecting device including at least one light source for illuminating said test pattern chart on said image-taking devices, a means for forming images of said test pattern chart on said image-taking devices, a means for forming plural color component light beams and for regulating intensity of at least one of said plural color component light beams, and a means for uniting said plural light beams so that the test pattern chart is substantially illuminated with an illuminating device of multi-color matching said some color temperature of the light source; and a deflecting means for deflecting the optical axis of said lens means so that said optical axis coincide with the optical axis of said objective lens.

* * * * *